April 15, 1958 F. H. HAVINS 2,830,718
BOAT TRAILER
Filed Nov. 8, 1956

FELTON H. HAVINS
INVENTOR.

BY *Herbert J. Brown*

ATTORNEY

United States Patent Office 2,830,718
Patented Apr. 15, 1958

2,830,718

BOAT TRAILER

Felton H. Havins, Fort Worth, Tex.

Application November 8, 1956, Serial No. 621,101

5 Claims. (Cl. 214—84)

This invention relates generally to vehicle trailers and more specifically to an improved trailer frame construction of the type highly suitable for but not limited to boat trailers to be towed behind a powered vehicle.

The primary object of this invention is to provide an adjustable trailer frame construction wherein the trailer wheels are automatically raised and lowered to fit operating conditions.

Another object is to provide a boat trailer frame which includes a unique construction whereby the boat itself operates a mechanism to raise and lower the trailer wheels from a loading to a travel position.

A still further object is to provide an extremely effective and rugged device which is economical in construction and fool-proof in operation.

And another object is to provide a boat trailer with vertically adjustable wheels which does not require any power means other than that normally required to mount the boat on the trailer.

And yet another object of this invention is to provide an adjustable wheel trailer which will automatically assume a road travel position when fully loaded and which will automatically assure a lowered and properly inclined position at the proper time during the unloading operation.

These and other objects will be apparent from an examination of the following specification and drawing in which.

Figure 1:
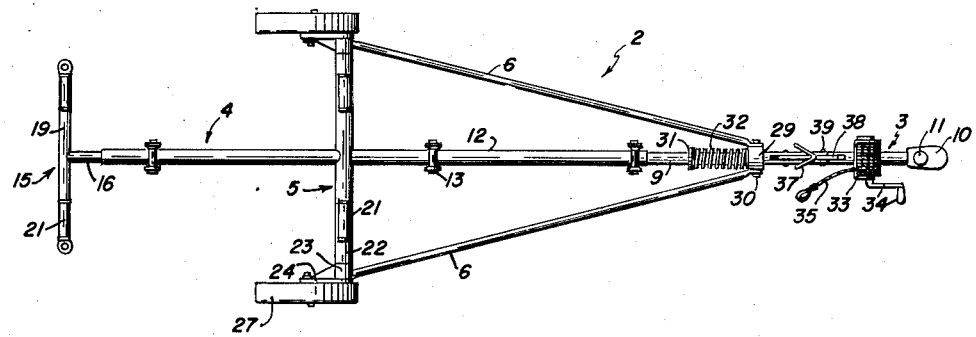
Figure 1 represents a top plan view of the trailer of this invention.
Figure 2:
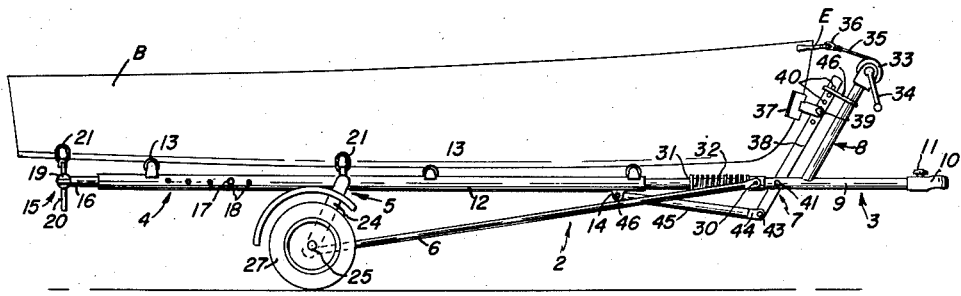
Figure 2 is a side elevational view of the trailer of this invention carrying a boat as its load in the desired travel position.
Figure 3:
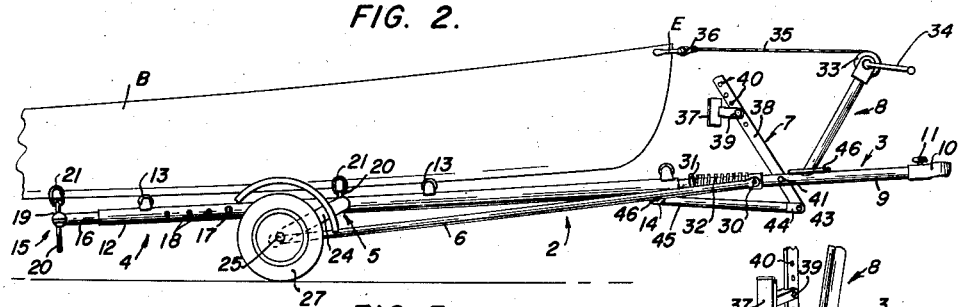
Figure 3 is a side elevational view of the device of Figure 2 with its boat load in the lowered or loading-unloading position.
Figure 4:
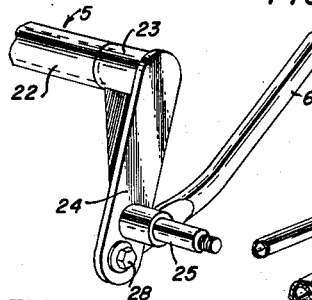
Figure 4 is a cut-away perspective view of details of the pivoting wheel axle of the device of this invention.
Figure 5:
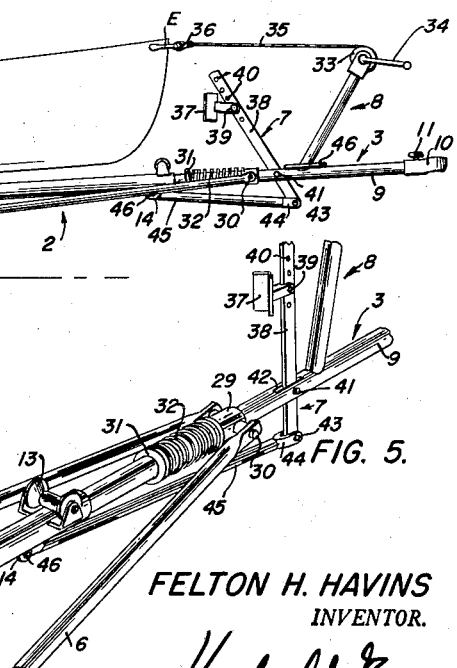
Figure 5 is a cut-away perspective view of details of the leverage and sliding frame of the invention.

Referring now more particularly to the characters of reference of the drawing in Figures 1–3, the trailer of this invention indicated generally at 2 is seen to consist basically of a forwardly extending trailer tongue 3, a sliding longitudinal member 4, a wheel supporting cross member 5, a pair of angularly inclined brace rods 6, a lifting mechanism 7, and an upstanding winch support structure 8. The longitudinal member 4 and cross member 5 combine to form the bed of this trailer.

The tongue 3 consists of an elongated longitudinally extending rod or tubular member 9 on the front end of which there is attached a conventional trailer hitch 10 which may be attached or detached from a corresponding automobile hitch member (not shown) by means of hand knob 11. Member 9 extends lengthwise from trailer hitch 10 to a substantial distance into longitudinal member 4.

Member 4 comprises a relatively long tubular sleeve 12 having guide roller assemblies 13 welded thereon at spaced points throughout its length. Toward the forward end of member 4 a bracket 14 is welded to the underside for a purpose hereinafter disclosed. At the rearward end of member 4 is attached a roller support member 15 which is made up of a longitudinal pipe or rod 16 which extends a substantial distance into sleeve 12 and which contains a bolt hole 17 which aligns with one of a series of spaced holes 18 in sleeve 12 to permit longitudinal adjustment of roller support member 15; cross arm 19 is welded to rod 16 to form a T-shaped frame and vertically adjustable roller frames 20 are installed near each lateral end of arm 19 so that rollers 21 may be made to engage the underside of a boat such as B which is placed on trailer 2.

Cross member 5 includes a transversely extending pipe 22 which is welded to longitudinal member sleeve 12 and is pivotally engaged at its lateral open ends by pivot boss 23 of wheel link structure 24 which structure also contains an outwardly projecting stub axle 25 and a pivot hole 26 (not visible in the drawing) at its lower extremity. Conventional rubber tired wheels 27 are journalled on axles 25 to furnish ground engaging mobile support for the trailer 2 and boat B. Member 5 includes a pair of spaced roller frames 20 to supplement the support given boat B at this point.

Rods 6 are inclined so as to lend stability to the trailer frame and they also locate the wheels 27 at a predetermined distance from the trailer hitch 10. Pivot bolt 28 permits link 24 to pivot upward under the proper conditions to raise pipe 22 and consequently member 4, and vice versa. The forward ends of rods 6 are attached to collar 29 by means of pins 30 in such a way that rods 6 may pivot slightly about pins 30 and collar 29 may slide longitudinally on member 9. A disk 31 is welded to member 9 to provide a back stop for compression spring 32 which will be seen to function as a shock absorber for the wheels 27.

The winch support structure 8 includes a hand powered winch 33 operated by handle 34 to reel in cable 35 which is fastened by its end fitting 36 to the eye E at the bow of boat B. It will be obvious that clockwise rotation of handle 34 will pull boat B toward the forward end of trailer 2.

As the boat B has moved forward to a certain point, the bow of boat B will engage V-shaped bracket 37 which is pivoted to vertical link 38 of mechanism 7 by means of pin 39 in one of the selected holes 40. Link 38 is in turn pivoted at 41 where it extends downward through slot 42 of tongue 3 and pivoted again at 43 where it attaches to bifurcated bracket 44 of push arm 45. The bracket 14 of longitudinal member 4 is pin connected at 46 to push arms 45 so that when the bow of boat B engages and pushes against V-bracket 37, rearward movement is transmitted through link 38, pivots 41, 43 and push arm 45 to move sleeve 12 rearward and lift link 24 and the entire main section of the frame of trailer 2 to place the boat and trailer in a road travelling position. Link 38 and rigid support 8 may be locked together if desired by ring 46 which is pivoted to winch 33.

Likewise, when winch 33 is rotated in a counterclockwise direction, cable 35 will pay out and the weight of boat B on rollers 21 of cross member 5 will cause the link 24 to drop down as rapidly as the slack in cable 35 will permit until such time as link 24 is as low as it can go or when sleeve 12 has reached stop disk 31. At this point the longitudinal member 4 will be inclined as shown in Figure 3 and the boat may be lowered on into the water by one man standing near winch 33 and trailer 2 may be pulled forward out of the way upon disconnecting fitting 36 from eye E. By this method the person unloading the boat does not need to wade in the water or even get his feet wet to accomplish the desired launching.

The invention is not limited to the exemplary form of the invention herein described, but may be made in various ways within the scope of the appended claims.

What is claimed is:

1. A load carrying trailer comprising: a longitudinally extending tongue, an elongated longitudinal member slidably engaging said tongue, a cross member attached to said longitudinal member and extending laterally therefrom and forming a bed therewith, ground engaging wheels supporting said cross member, and means between said tongue and longitudinal member to raise and lower said bed in response to a predetermined position of said load on said bed.

2. A load carrying trailer comprising: an elongated tongue, an elongated longitudinal member slidably engaging said tongue, a cross member attached to said longitudinal member and extending laterally therefrom and forming a load carrying bed therewith, spaced links pivoted in said cross member, ground engaging wheels journalled to said links and supporting said cross member, a brace connecting tongue and each of said links, means to move said longitudinal member and said links at said pivoted point rearward to raise said trailer bed upward from said wheels.

3. A load carrying trailer as in the next preceding claim wherein said means are automatically actuated by the position of said load on said trailer.

4. A load carrying trailer comprising: an elongated tongue, an elongated longitudinal member slidably engaging said tongue, a cross member attached to said longitudinal member and forming a load carrying bed therewith, downwardly inclined laterally spaced links pivoted in said cross member, ground engaging wheels journalled in said links and thus supporting said cross member, a rigid brace pivotally connected at one end to said link and at its other end to said tongue on each side thereof for locating said wheels, means to move said longitudinal member rearward without moving the location of said wheels and thereby cause the links to pivot about their connections with said braces and raise said cross member and trailer bed.

5. A load carrying trailer comprising: an elongated tongue, an elongated longitudinal member slidably engaging said tongue, a cross member attached to said longitudinal member and forming a load carrying bed therewith, ground engaging wheels for supporting said trailer, links pivotally attached to said cross member and supporting said wheels, brace means pivoted at one end to said wheel supporting links and resilient means attaching the other end of said brace means and said tongue.

References Cited in the file of this patent

UNITED STATES PATENTS 2,740,639    Eckroad  ---------------- Apr. 3, 1956